Dec. 23, 1941.  R. L. WILCOX  2,267,514
HEADER OR UPSETTING MACHINE
Filed Dec. 28, 1940  5 Sheets-Sheet 1

Fig. 1.

INVENTOR
RICHARD LESTER WILCOX
BY
ATTORNEY

Dec. 23, 1941.   R. L. WILCOX   2,267,514
HEADER OR UPSETTING MACHINE
Filed Dec. 28, 1940   5 Sheets-Sheet 2

INVENTOR
RICHARD LESTER WILCOX
BY George Etsell
ATTORNEY

Dec. 23, 1941.     R. L. WILCOX     2,267,514
HEADER OR UPSETTING MACHINE
Filed Dec. 28, 1940     5 Sheets-Sheet 3

INVENTOR
RICHARD LESTER WILCOX
BY
ATTORNEY

Dec. 23, 1941.  R. L. WILCOX  2,267,514
HEADER OR UPSETTING MACHINE
Filed Dec. 28, 1940   5 Sheets-Sheet 4

INVENTOR
RICHARD LESTER WILCOX
BY
ATTORNEY

Patented Dec. 23, 1941

2,267,514

UNITED STATES PATENT OFFICE 2,267,514

HEADER OR UPSETTING MACHINE

Richard Lester Wilcox, Waterbury, Conn., assignor to The Waterbury Farrel Foundry and Machine Company, Waterbury, Conn., a corporation of Connecticut Application December 28, 1940, Serial No. 372,093

42 Claims. (Cl. 10—15)

This invention relates to new and useful improvements in headers or upsetting machines.

A principal object of the invention is to provide a machine of this character that will fabricate a more perfect product at a much higher speed than heretofore possible. This, and other objects, contemplate making provision to successively cut off workpieces from a wire length, the cut off end of which will be square and perpendicular to the length of the workpiece and hold the wire length rigid and against movement during the cut-off operation. A further object is to reduce to a minimum the length of the path of travel of the workpiece from the cut-off tools to the working die, and whereby the speed of the machine may be materially increased and its operations simplified; to provide a knockout mechanism, or the like that may be readily attached to and detached from its operating connection without changing the length of its stroke or requiring readjustment, which mechanism will provide for varying lengths of stroke of the knockout mechanism. Other objects and advantages will be referred to or become apparent from the following description of a preferred embodiment of the invention and as shown in the accompanying drawings.

To these and other ends this invention consists in the header or upsetting machine, having certain details of construction and combinations of parts, substantially as hereinafter described and shown on the accompanying drawings.

Referring to the drawings, in which like numerals of reference indicate like parts in the several figures.

Figure 1:
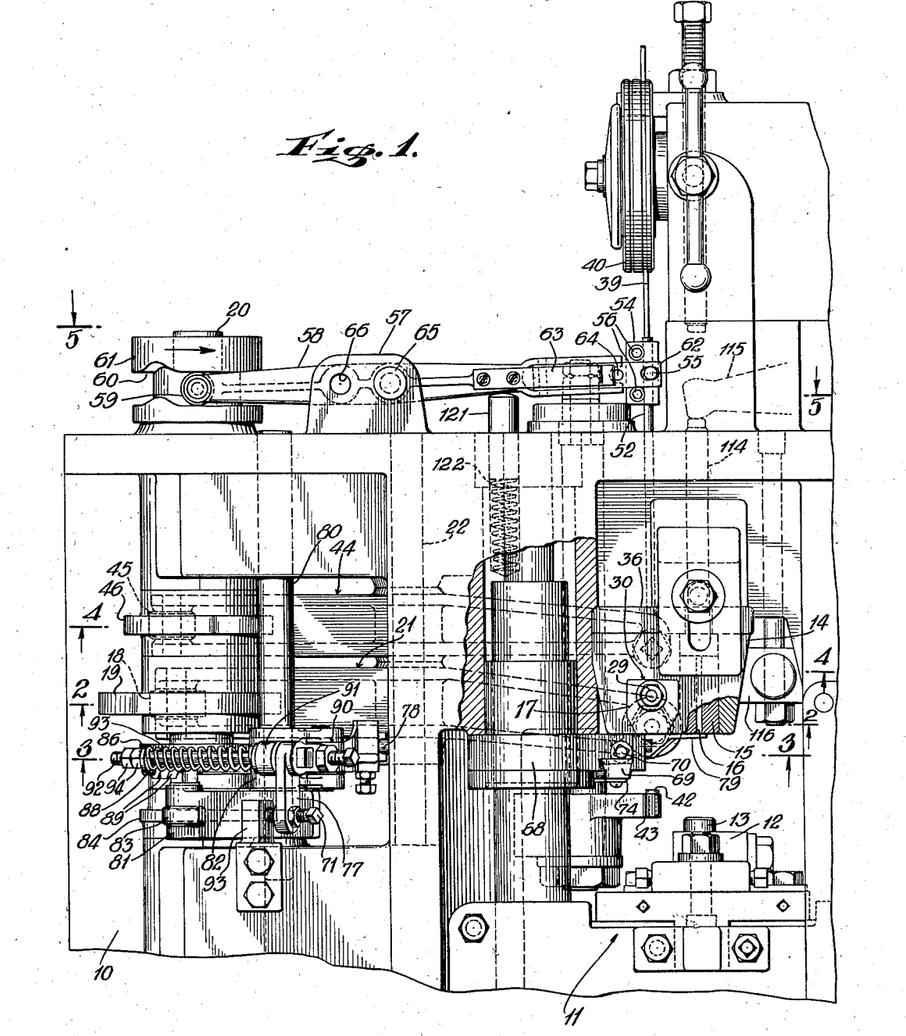
Figure 1 is a fragmentary plan view of a portion of a header or upsetting machine, having the improvements herein referred to forming part thereof.
Figure 2:
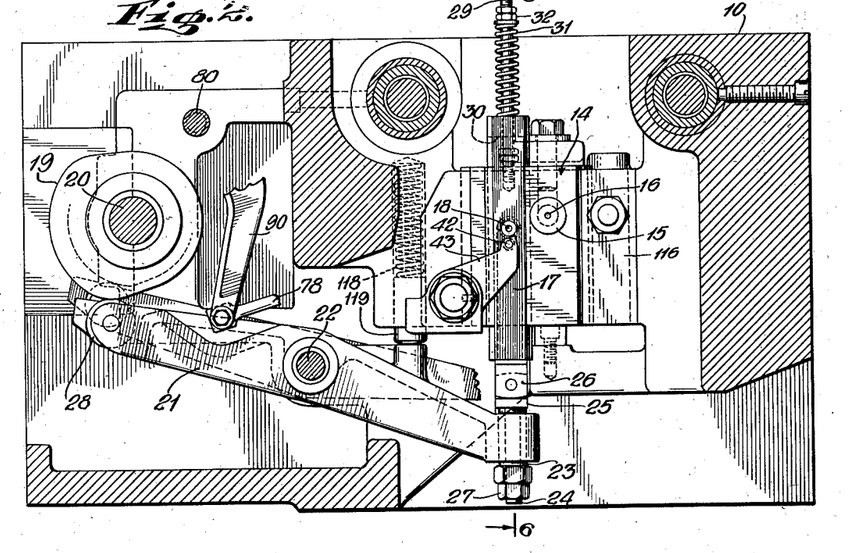
Figure 2 is a transverse sectional view thereof with the parts in section taken generally upon line 2—2 of Figure 1.
Figures 6, 6A, 6B, 7, 8, 8A, 9:
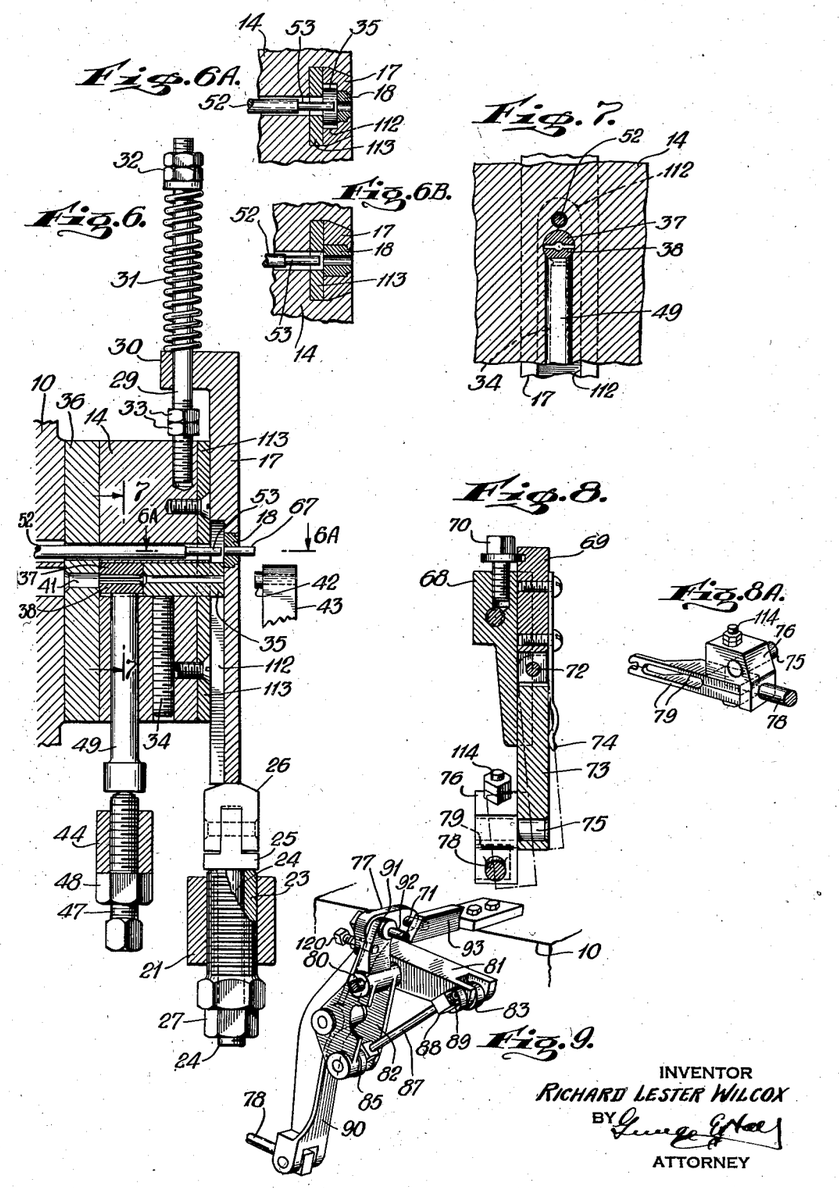
Figure 6 is a transverse sectional view of the die block, cut-off mechanism and associated parts there shown in section being taken generally upon line 6—6 of Figure 2.
Figure 6A is a detailed sectional view of a portion of the die mechanism with the parts in section upon line 6A—6A of Figure 6.
Figure 6B is a detailed sectional view similar to that shown in Figure 6A but of a different form.
Figure 7 is a sectional view of a portion of the die block and associated parts, those shown in section being taken generally upon line 7—7 of Figure 6.
Figure 8 is a sectional view of a portion of the transfer mechanism, the parts in section being taken generally upon line 8—8 of Figure 3.
Figure 8A is a perspective view of the swivel block and associated transfer fingers.
Figure 9 is a perspective view of a portion of the transfer mechanism.

In the drawings, 10 indicates the body of a header, upsetting machine or the like; 11 a reciprocating gate carrying a punch holder 12, within which is mounted a punch 13. Secured in the bed opposite the punch holder 12 is a die holder 14, within which is mounted a working die 15, having an opening 16 to receive the workpiece. This die holder is securely held in part, as is usual, by a wedge 116. Mounted in the die block is a slide 17 carrying a cut-off die 18 and having a recess 112 in its rear face. This slide is actuated in one direction from a cam 19 on a shaft 20, through cam rolls 28 and a rock lever 21 journaled on a shaft 22. It is moved in the opposite direction by a spring 118 and a plug 119 in engagement with the lever 21 (Fig. 2). In the inner end of this rock lever 21 is a hollow screw 23, through which is projected the shank 24 of a yoke pin 25, to which is pivotally secured the yoke member 26 in engagement with one end of the slide 17 (Fig. 6).

The relative position of the yoke member 26 is varied by adjustment of hollow screw 23 in the rock lever 21. Fixed in the die block is a stud 29, which projects through a lip 30 upon the slide 17 and surrounded in part by a spring 31 between the check nut 32 and the lip 30. The slide 17 is moved in one direction by the spring 31 and the limit of such movement is determined by the engagement of lip 30 with the check nuts 33. Held securely within the die block or holder by screws 34 or the like, is a stationary cut-off die 35, having an opening therethrough to receive the wire length. Between the cut-off die 35 and the backing plate 36 are the clamping dies, composed of two parts 37 and 38, which in one position (open) are spaced apart slightly. In each opposing face of the parts 37 and 38 is a recess that in cross section is substantially the same shape as approximately one-half of the cross section of the wire length 39. This wire length 39 is advanced intermittently by mechanism 40, of any well known type, through an opening 41 in the backing plate 36 between the parts 37 and 38 of the clamping dies through the opening in the stationary cut-off die 35 and through the opening in the movable cut-off die 18, which dies are then in register with each other, until it engages the stop pin 42. This pin is fixed in a stop arm 43 that is adjustable toward and away from the stationary cut-off die 35 and may be rotated to move into and out of the path of the wire length.

Stop mechanism of this general form is well known in the art. When so positioned, and before a workpiece is cut from the wire length the parts 37 and 38 are closed and thereby grip the wire length, thus preventing it from "kicking back" under the cut-off pressure. Mechanism for closing the clamping dies includes a rock lever 44 journaled on the shaft 22 and carrying a cam roll 45 which rides against a cam 46 on the shaft 20. Threaded through the free end of the rock lever is a screw 47, carrying a check nut 48 that engages a pressure plunger 49 movable in the die block or holder 14.

Figure 4:
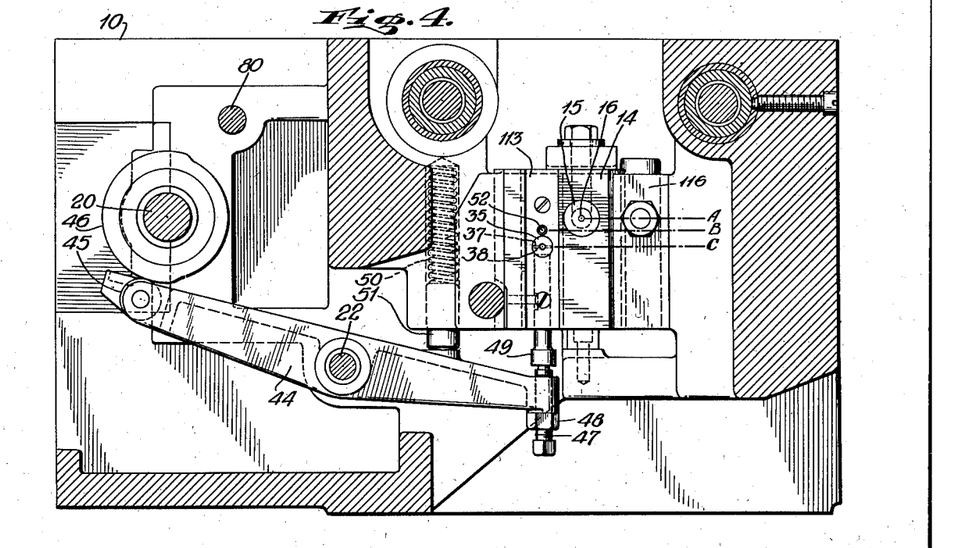
Figure 4 is a transverse sectional view thereof with the parts in section taken generally upon line 4—4 of Figure 1.

Adjustment of the set screw 47 and check nut 48 provides means to vary the pressure upon the gripping dies. The lever 44 is moved in one direction by the spring 50 and a plug 51 in engagement with the lever 44 (Fig. 4). The plunger 49 is thus positively actuated to grip the wire length and such grip is released by yielding mechanism.

The knockout pin is designated 52, the outer end 53 of which is reduced to approximately the diameter of the wire rod or length (Fig. 6). Adjustable on the knockout pin 52, outside of the body of the machine, is a clamp block 54, secured in its adjusted positions by screws 56.

A rock lever 58, having a cam roll 59 at one end, which rides in the groove 60 of the barrel cam 61 on shaft 20, is hinged between lugs 57 on the body member 10.

Hinged to this rock lever 58 is a leaf member 62, held in its down or closed position by a spring 63, and having an opening into which the connection pin 55, fixed in the clamp block 54, projects, thus providing a separable connection between the rock lever 58 and the knockout pin 52. A fixed pin 64, in the leaf 62, projects through an opening in the rock lever 58 (Fig. 5), holding the leaf against lateral movement, and providing a convenient means for manually swinging the leaf upon its hinged mounting, accomplished by slight pressure by the thumb on the lower end of the pin 64. Rotation of the barrel cam 61 imparts endwise movement to the knockout pin 52 through the above described mechanism.

Figure 5:
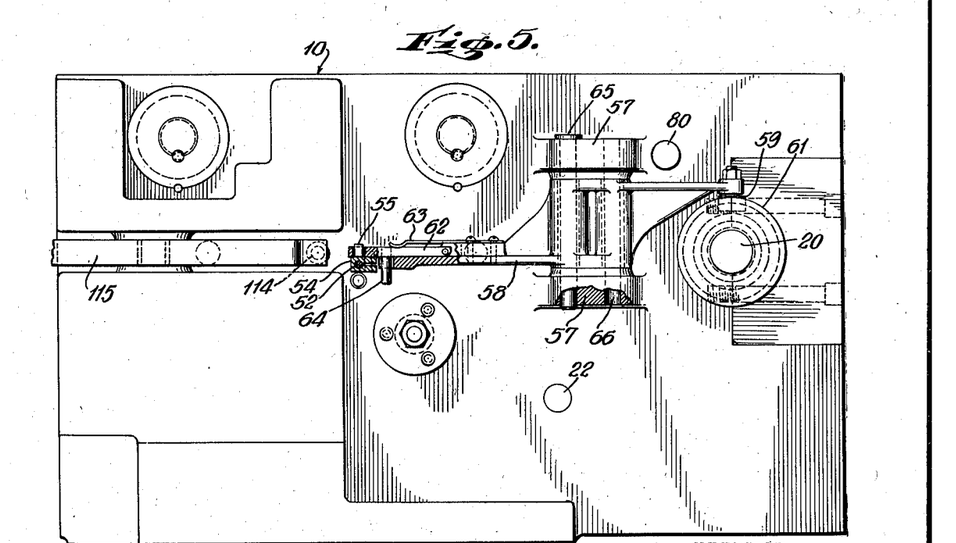
Figure 5 is a transverse sectional view thereof with the parts in section taken generally upon line 5—5 of Figure 1.

There are two companion openings in both the lugs 57 and the rock lever 58, which register with each other. By shifting the pin 65 from the set of openings, as shown in Figure 5, to the parallel opening 66, a longer stroke of the knockout pin is obtained. Thus, by merely shifting the pin 65 to either one of the two sets of openings, the length of the stroke of the knockout pin is varied between the two extremes thereof. Two sets of openings for the hinge pin 65 are shown, but a greater number may be provided if desired. The length of the blank is a factor in determining the stroke of the knockout pin.

A plug 121 in engagement with the rock lever 58, and under urge of spring 122, exerts a constant pressure upon said rock lever and obviates lost motion that may develop from interfering with the accurate movement of any member dependent in part upon said lever.

Dies for two lengths of blanks are illustrated particularly in Figures 6A for a short blank and 6B for a long blank. With a short length blank a shorter stroke of the knockout pin is required than for a longer blank, as will be apparent from the relative position of the outer end 53 of the knockout pin and the adjacent die.

To dismantle the knockout pin it is merely necessary to lift the leaf 62 by pressure upon the end of the pin 64, thus disengaging the leaf from the connecting pin 55 and thereafter withdrawing the knockout pin. The knockout pin is assembled by reversing these operations and in its reassembled position occupies its former position.

The cam 61 gives the knockout pin 52 a forward or ejecting movement when the slide 17 is in its up position with the die, and the die 18 is in register therewith, substantially as shown in Figure 6. In this manner the workpiece 67 is ejected from the die by the knockout pin and into the transfer mechanism. As illustrated herein, the working die 15 is in one plane, indicated by the letter A, in Figure 4, the stationary cut-off die 35 and the movable cut-off die 18, when in their cut-off position, in another plane, indicated by the letter C in the same figure, and the blank is pushed out of the movable cut-off die 18 by the knockout pin in an intermediate plane, indicated by the letter B. The workpiece when ejected by the knockout pin is transferred to a position substantially in line with the working die 15 through the shortest possible path by mechanism substantially as herein described.

Other mechanism than that shown and described, however, may be substituted. The form of transfer mechanism illustrated in Figure 3, includes in part a suitably mounted rock arm 68, having a groove, within which is a carrier 69 that is relatively adjustable by means of a screw 70 (Fig. 8), having a collar that projects into a recess in the carrier. Hinged to this carrier 69 by the pin 72 is a lever arm 73 normally held with one wall thereof against the bottom of the groove in the rock arm 68 by the flat spring 74 or the like.

A swivel block 76 upon the end of the finger rod 78 is journaled on a pin 75 fixed in the lever arm 73. In one side of the swivel block 76 (Fig. 8A) is a recess to receive the two cooperating transfer fingers 79 shaped at their outer ends to receive and hold the workpiece 67 therebetween when in their closed position. These fingers at their rear ends engage the walls of the recess in the swivel block 76 and are rigidly secured thereby the bolt 114. As so assembled, these fingers are rigidly associated with the finger rod 78. Fingers of this character are well known in the art and do not require further description.

Mounted on a fixed pin 80 are two rock levers 81 and 82, the former having a cam roll 83 which rides on the cam 84, and the latter a cam roll 85 which rides on the face of the cam 86, both of these cams being fixed on the shaft 20. The outer end of each of these rock levers is joined by a member 87 that is connected with rock lever 82 and projects through a block 88 movably mounted in rock lever 81. The lock nuts 89 on the member 87 determine the relative position of the levers.

Figure 3:
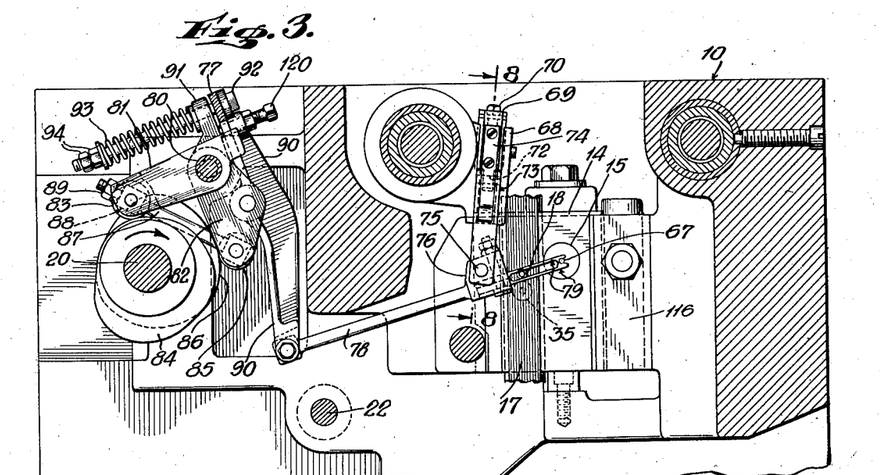
Figure 3 is a transverse sectional view thereof with the parts in section taken generally upon line 3—3 of Figure 1.

Journaled on the lever 82 is a rock lever 90, with the lower end of which the finger rod 78 is pivotally connected. Projecting through the rock lever 90 and a lug 91, on the rock lever 82, is a stud 92, surrounded in part by a coil spring 93, the tension of which is varied by adjustment of the check nuts 94. A stop screw 71 threaded through an arm 77 on the lever 82 engages a fixed stop member 93 and limits the extent of movement of the finger rod 78 and the transfer fingers 79 in one direction. The parts are timed so that the fingers 79 engage and hold the workpiece 67 as it is projected by the knockout pin 52 out of the movable cut-off die when it is in plane B. The end 53 of the knockout pin 52, when in its out position, projects entirely through the movable cut-off die 18. As the workpiece is now held by the fingers 79, the knockout pin 52 is withdrawn and the slide 17 moves to its down position. The openings in the cut-off dies again register with each other and are ready for the next feed of the wire length. The successive cut-off and transfer operations in plane C to the knockout position in plane B are successively repeated. With the workpiece grasped as described, the finger rod 78 is actuated by the cam 86 and moved toward the working die 15, carrying with it the workpiece until the same is in register with the opening in the working die 15, in plane A (Fig. 3). When so positioned, the gate 11 moves forward, the punch 13 engages the workpiece and projects it into the die 15 and functions in a well known manner. As the inner end of the workpiece enters the opening 16 in the die 15 a sufficient distance to support it, the transfer fingers 79 are withdrawn through the action of the cam 84, returning to its former position ready to engage the next succeeding workpiece and transfer it to the working die. If perchance there should be an obstruction in the path of the fingers 79, the spring 93 will yield and allow the levers 81 and 82 to function in their usual manner without imparting movement to the finger rod 78 and fingers 79 connected therewith. Adjustment of the fingers 79 to insure registry with the opening in the working die is obtained by manipulation of the stop screw 120 that will vary the position of the rock lever 90. As the fingers approach the working die it is possible that the preceding workpiece may not have been ejected therefrom. In such case the fingers while moving forward will be forced outward and away from the face of the working die by this obstruction. This movement is accommodated by the lever arm 73, which will yield against the tension of the spring 74. Hence the fingers will not be broken or damaged or any other parts associated therewith. By broken lines the outward relative position of the lever arm and associated parts is shown in Figure 8. The joint between the finger rod 78 and rock lever 90 is sufficiently loose to permit this slight lateral movement at the outer end of the fingers 79.

This safety mechanism is particularly advantageous when balls are being made in the header. In such case the recess in both the punch and die are substantially half spheres. If perchance the knockout pin has failed to eject the ball from the die, the workpiece as it advances is free to spring away from the face of the die and pass over the ball remaining in the die. This prevents breakage of parts. Normally, the fingers 79 during their back and forth movement, ride against the face of the die block and die.

Figures 10, 11, 12:
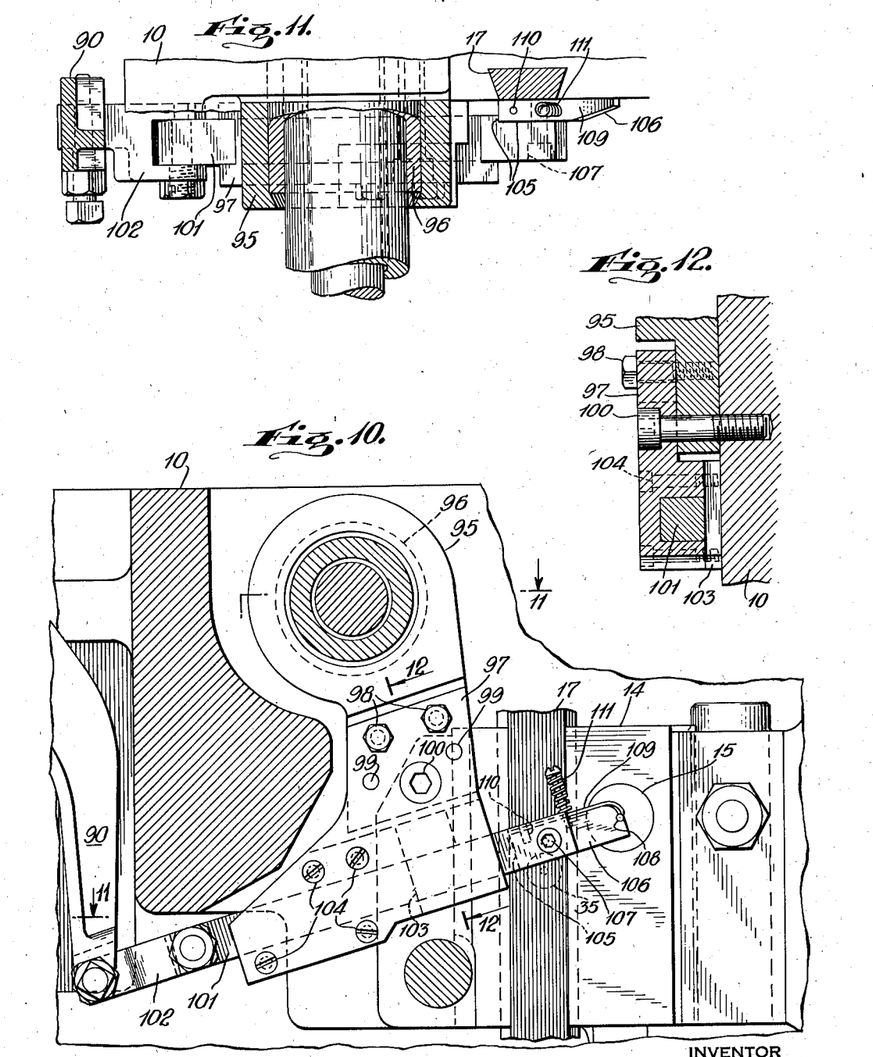
Figure 10 is a transverse sectional view similar to Figure 3 with another form of transfer mechanism.
Figure 11 is a sectional view of a portion of the transfer mechanism shown in Figure 10, the parts in section being taken generally upon line 11—11 of Figure 10.
Figure 12 is a detailed sectional view of a portion of the transfer mechanism, the parts in section being taken generally upon line 12—12 of Figure 10.

An alternative form of transfer mechanism adapted for use with this invention, is shown in Figures 10, 11 and 12. In this form there is a bracket 95 on a bushing 96, or the like, to which is secured a guide member 97 by screws 98 and dowels 99 or the like.

A screw 100 holds both the bracket 95 and guide member 97 in a fixed position relative to the body 10. Movable in the guide member 97 and against the cap 103 fixed thereto by the screws 104, is a slide 101, that is rectangular in cross section, and connected with the rock lever 90 by the link 102.

The slide 101 at its outer end is notched at 105 to receive a transfer finger 106 held in place by a screw 107. This finger is notched at 108 to receive a workpiece which is held against premature dislodgment by a finger 109 that is held against lateral and endwise movement by a pin 110 and against the transfer finger by the spring 111. This type and form of transfer finger is well known in the art. Movement of the slide 101 is acquired from the cams 84 and 86 in the same manner as the finger rod 78. There is this difference, however, that the transfer fingers 79 on finger rod 78 move through an arc of a circle, while the transfer finger 106 moves in a straight path.

The distance between the cut-off station and the push out station is short, in fact only sufficient to insure the clearance of moving parts, hence the travel of the slide carrying the movable cut-off die is likewise very short. This minimizes the time consumed in travel of the workpiece from the cut-off station to the station where it is received by the transfer mechanism. Additional time is saved in the operations upon each workpiece by the fact that its travel from the last mentioned station to the working die at the fabricating station is in the shortest possible path. The accumulated time thus saved in these two steps in the course of an hour or a day is considerable and materially increases the output of the machine.

The present disclosure is given by way of example as one means for practicing the present invention and as illustrating the principle and application thereof, and that the invention is not to be limited to such disclosure. The invention covers all forms or modifications coming within the scope of the appended claims.

What is claimed is:

1. In a machine of the character described, a cut-off station, a fabricating station, and a push out station, the relative positions of said stations parallel to the base of the machine being such that a separate line extending through each of said stations will be substantially parallel with and spaced from the line extending through each of the other stations.

2. In a machine of the character described, a cut-off station, a fabricating station, and a push out station, the relative positions of said stations parallel to the base of the machine being such that a separate line extending through each of said stations will be substantially parallel with and spaced from the line extending through each of the other stations, and the line extending through the push out station being between the lines extending through the other two stations.

3. In a machine of the character described, a cut-off station, a fabricating station, and a push out station, each station being in a different horizontal plane, the cut-off station and the push out station being in substantially the same vertical plane.

4. In a machine of the character described, a cut-off station, a fabricating station, and a push out station, each station being in a different horizontal plane, the cut-off station and the push out station being in substantially the same vertical plane with the plane of the push out station being between that of the cut-off and fabricating stations.

5. In a machine of the character described, a movable die that receives a workpiece at a cut-off station, a working die in a plane different than that of the cut-off station, a push out station in a plane between that of the cut-off station and the plane of the working die, and a transfer mechanism to carry the workpiece from the push out station to the working die in a substantially straight path at other than a right angle to its path of travel with the movable die between the cut-off station and the push out station.

6. In a machine of the character described; a fixed member, as a die holder or the like; a fabricating die; a cut-off die; a slide having a cut-off die therein, actuated positively in one direction and yieldingly in the opposite direction, the positive means comprising in part a rock member moved in one direction by a cam; an adjustable element in the free end of the rock member; and a yoke member connected with the adjustable element and positioned between the rock member and the slide.

7. In a machine of the character described; a fixed member, as a die holder or the like; a fabricating die; a cut-off die; a slide having a cut-off die therein, actuated positively in one direction and yieldingly in the opposite direction, the positive means comprising in part a rock member moved in one direction by a cam; an adjustable element in the free end of the rock member; and a yoke member pivotally connected with the adjustable element and having engagement with the slide.

8. In a machine of the character described; a fixed fabricating die; a fixed cut-off die; a slide having a cut-off die therein, actuated positively in one direction and yieldingly in the opposite direction, the positive means comprising in part a rock member moved in one direction by a cam; an adjustable element in the free end of the rock member; a yoke member connected with the adjustable element and positioned between the rock member and the slide; and means applying tension to the rock member whereby it will be held in constant engagement with said cam, comprising in part a plug movably mounted in a fixed part having engagement with the rock member; and an elastic member in the fixed part applying tension to the plug.

9. In a machine of the character described, a fabricating die, a cut-off die, the relative positions of said dies being such that a separate line extending through each die parallel to the base of the machine will be substantially parallel with and spaced from a line extending through the other die, a slide having a cut-off die therein, and means for positively actuating the slide in one direction whereby it will be moved to a plane between that of the cut-off die and that of the fabricating die said plane being so positioned that a line lying therein will be substantially parallel with the aforesaid lines and spaced therebetween.

10. In a machine of the character described, having a fabricating station, a push out station, and transfer mechanism to carry a workpiece from the push out station to the fabricating station, such transfer mechanism comprising in part a rock member, a rod member or the like, having a hinged joint connection with the rock member, a rock arm, a hinged joint connection between the rock arm and rod member, and gripping fingers associated with and movable with the rod member.

11. In a machine of the character described, having a fabricating station; a push out station and transfer mechanism to carry a workpiece from the push out station to the fabricating station, such transfer mechanism comprising in part a rod member or the like, having a head thereon with a recess in one wall thereof; and gripping fingers held securely within said recess and projecting beyond the end of the rod member.

12. In a machine of the character described; having a fabricating station; a push out station; and transfer mechanism to carry a workpiece from the push out station to the fabricating station; means for moving said transfer mechanism in a substantially straight line to the fabricating station; and means as a transitory member for moving said transfer mechanism in a path at substantially a right angle to said straight line movement.

13. In a machine of the character described, having a fabricating station; a push out station; and transfer mechanism to carry a workpiece from the push out station to the fabricating station, such transfer mechanism comprising in part a rock member; a lever arm pivotally associated therewith; a rod member or the like, having a hinged joint connection with the lever arm; and means for imparting a substantially straight line movement to the rod member.

14. In a machine of the character described, having a fabricating station; a push out station; transfer mechanism to carry a workpiece from the push out station to the fabricating station, such transfer mechanism comprising in part a rock member; a lever arm pivotally associated therewith; a rod member or the like, having a hinged joint connection with the lever arm; means for imparting a substantially straight line movement to the rod member; and means for adjusting the straight line movement means, so that the relative position of the beginning and ending thereof may be varied.

15. In a machine of the character described, having a fabricating station; a push out station; transfer mechanism to carry a workpiece from the push out station to the fabricating station, such transfer mechanism comprising in part a rock member; a lever arm pivotally associated therewith; a rod member or the like, having a hinged joint connection with the lever arm; and means for imparting a substantially straight line movement to the rod member that will discontinue movement of the rod member if the latter, or any part associated therewith, meets an obstruction or the like.

16. In a machine of the character described, having a fabricating station; a push out station; transfer mechanism to carry a workpiece from the push out station to the fabricating station, such transfer mechanism comprising in part a rock member; a lever arm pivotally associated therewith; a rod member or the like having a hinged joint connection with the lever arm; means for imparting a substantially straight line movement to the rod member; and means as a spring or the like for exerting pressure upon the lever arm to hold the same in one of its positions.

17. In a machine of the character described, having a fabricating station; a push out station; transfer mechanism to carry a workpiece from the push out station to the fabricating station, such transfer mechanism comprising in part a rock member; a pivot block adjustably connected therewith; a lever arm hinged to the pivot block; and a spring member engaging the lever arm that applies pressure thereto to move the same toward the rock member, the lever arm having a hinged connection with the pivot block; and means for imparting a substantially straight line movement to the rod member.

18. In a machine of the character described; a fixed cut-off die; a movable die; means, partly surrounding a wire rod or length and holding it against movement while the workpiece is being cut from the end thereof, comprising in part a cam; a rock lever actuated in part by the cam; a plunger movable in a fixed part; and a member connected with the lever and engaging the plunger, whereby endwise movement is imparted to the plunger from the rock lever.

19. In a machine of the character described; a fixed cut-off die; a movable cut-off die; means, partly surrounding a wire rod or length, for gripping the wire rod or length and holding it against movement while the workpiece is being cut from the end thereof, comprising in part a cam, a rock lever actuated in part by the cam, a plunger movable in a fixed part, and an adjustable member connected with the lever and engaging the plunger, whereby endwise movement is imparted to the plunger from the rock member.

20. In mechanism of the character described having a push out station, a knockout mechanism for ejecting a workpiece at the push out station, comprising in part a rod, a cam, a member between the cam and rod, and a separable connection between the member and said rod that moves with the rod when in its connection position.

21. In mechanism of the character described having a push out station; a knockout mechanism for ejecting a workpiece at the push out station, comprising in part a rod; a cam, a fulcrumed member between the cam and rod; a separable connection between the member and rod; and means for varying the position of the fulcrum.

22. In mechanism of the character described, having a push out station; a knockout mechanism for ejecting a workpiece at the push out station, comprising in part a rod, a cam, a fulcrumed member between the cam and rod associated with a rigid part, and having plural openings that correspond in spacing with similar openings in the rigid part; and a fulcrum pin in said member and rigid part upon which the latter is journaled.

23. In mechanism of the character described, having a push out station; a knockout mechanism for ejecting a workpiece at the push out station, comprising in part a rod, a cam, a member between the cam and rod, a separable connection between the member and rod, and means for mounting the member, whereby varying lengths of stroke of the rod may be derived through said member from said cam.

24. In mechanism of the character described, having a push out station, a knockout mechanism for ejecting a workpiece at the push out station, comprising in part, a knockout rod, a block connected with the rod; a fulcrumed member; and a leaf member movably connected with the said member, and in one of its positions having an operative connection with said block.

25. In a machine of the character described, having a fabricating station, a push out station, transfer mechanism to carry a workpiece from the push out station to the fabricating station in a path that is at, other than a right angle, to both the push out and fabricating stations, such transfer mechanism comprising in part a guide member, a slide movable therein, a rock lever, a link connection between the rock lever and slide, a transfer finger connected with the slide, and means associated therewith for holding a workpiece during transit.

26. In a machine of the character described, having a cut-off station, a fabricating station, a push out station, transfer mechanism to carry a workpiece from the push out station to the fabricating station in a path that is at other than a right angle to a line passing through the centers of the push out and fabricating stations; such transfer mechanism comprising in part a guide member, a slide movable therein, angular in cross section, a rock lever, a link connection between the rock lever and slide, a transfer finger connected with the slide, and means associated therewith for holding a workpiece during transit.

27. In a machine of the character described, having a fabricating station, a push out station, transfer mechanism to carry a workpiece from the push out station to the fabricating station, such transfer mechanism comprising in part a guide member, a slide movable therein, angular in cross section, a cap secured to the guide member and in part covering the slide, a rock lever, a link connection between the rock lever and slide, a transfer finger connected with the slide, and means associated therewith for holding a workpiece during transit.

28. In a machine of the character described, having a fabricating station, a push out station and transfer mechanism to carry a workpiece from the push out station to the fabricating station, such transfer mechanism comprising in part a plurality of cams, a plurality of levers, each lever being actuated by a different cam, a rock lever journaled upon one of said levers and having a yielding connection with another of said levers, a rod member having a movable connection with the rock lever, and gripping fingers associated with the rod member and projecting beyond the end thereof.

29. In a machine of the character described, having a fabricating station, a push out station, transfer mechanism to carry a workpiece from the push out station to the fabricating station, such transfer mechanism comprising in part, a plurality of cams, a plurality of levers, each lever being actuated by a different cam, a connection between the outer ends of said levers and whereby the relative position of said levers is determined, a guide member, a slide movable therein, a rock lever, a link connection between the rock lever and slide, a transfer finger connected with the slide, and means associated therewith for holding a workpiece during transit.

30. In a machine of the character described, having a fabricating station, a push out station, transfer mechanism to carry a workpiece from the push out station to the fabricating station, such transfer mechanism comprising in part a rock lever means, as an adjustable member in the path of a fixed member, for varying the extent of movement of said rock lever, a guide member, a slide movable therein, a rock lever, a link connection between the rock lever and slide, a transfer finger connected with the slide, and means associated therewith for holding a workpiece during transit.

31. In a machine of the character described, a fixed cut-off die; a moving cut-off die; and means, partly surrounding a wire rod or length for gripping the wire rod or length and holding it against end movement with its outer end held against a fixed stop while a workpiece is being cut off from the end thereof, said fixed die and gripping means being mounted in the same member.

32. In a machine of the character described; a die holder having an opening therein; a fixed cut-off die; a moving cut-off die; and means, partly surrounding a wire rod or length for gripping the wire rod or length and holding it against movement with its outer end held against a fixed stop while the workpiece is being cut off from the end thereof and being surrounded or confined in the moving cut-off die, said fixed die and gripping means being within the opening in the die holder.

33. In a machine of the character described; a die holder; a fixed cut-off die within the die holder; a movable cut-off die; and means, as gripping dies in the die holder, for gripping a wire rod length and holding it against movement while a workpiece is being cut from the end thereof.

34. In a machine of the character described; a cut-off station; a fabricating station; and a push out station, the relative positions of said stations being such that, when viewed from one position, a separate line extending through each station parallel to the base of the machine will be substantially parallel with and spaced from the line extending through each of the other stations, with the line extending through the push out station being between the lines extending from the other two stations, and when viewed from another position a line extends through two stations and is substantially parallel with the line extending through the other station.

35. In a machine of the character described; a cut-off station; a fabricating station; and a push out station, the relative positions of said stations being such that, when viewed in one position, a separate line extending through each station parallel to the base of the machine will be substantially parallel with and spaced from a line extending through each of the other stations with the line extending through the push out station being between the lines extending from the other stations, and when viewed from another position one line extends through the cut-off station and push out station and is substantially parallel with the line extending through the fabricating station.

36. In mechanism of the character described having a push out station and a knockout mechanism for ejecting a workpiece at the push out station, comprising in part a rod, a cam, mechanism between the cam and rod for imparting endwise movement thereto, and a separable connection between the rod and the actuating mechanism, comprising in part a member movably mounted on one part and having an interlocking engagement with another part.

37. In mechanism of the character described having a push out station and a knockout mechanism for ejecting a workpiece at the push out station, comprising in part a rod, a cam, mechanism between the cam and rod for imparting endwise movement thereto, and a separable connection between the rod and the actuating mechanism, comprising in part an element hinged to the member and having an interlocking engagement with the rod.

38. A header or upsetting machine having a shaft, a push out station, a knockout mechanism for ejecting a workpiece at the push out station, comprising in part a rod substantially parallel with the shaft, means upon one side of the rod, actuated from the shaft for imparting a reciprocatory movement to the rod, and a connection between the said means and rod at a point between the ends of the rod.

39. In a header or upsetting machine having a shaft, a push out station, a knockout mechanism for ejecting a workpiece at the push out station, comprising in part a rod substantially parallel with the shaft, and means upon one side of the rod actuated from the shaft and detachably connected to the rod for imparting a reciprocatory movement thereto.

40. In mechanism of the character described having a push out station a knockout mechanism for ejecting a workpiece at the push out station, comprising in part a rod, a cam, pivotally mounted mechanism between the cam and rod for imparting endwise movement thereto, and a separable connection between the rod and the actuating mechanism that moves with the rod when in its connection position.

41. In mechanism of the character described having a push out station, a knockout mechanism for ejecting a workpiece at the push out station, comprising in part a rod, a cam, a member between the cam and rod, and a separable connection between the member and said rod that moves with the rod when in its connection position.

42. In a machine of the character described; a die holder having an opening therein; a fixed cut-off die; a moving cut-off die; means, as a plural part gripping die, partly surrounding a wire rod or length; and a member actuated in timed relation with the moving cut-off die, that applies pressure to one part of the gripping die, to the wire rod or length, and through the wire rod or length to another part of the gripping die, which is held thereby against a wall, gripping and holding the wire rod or length against endwise movement, while a workpiece is being cut from the end thereof at substantially a right angle with the shearing face of the cut-off die, said fixed cut-off die, and gripping die being within the opening in the die holder.

RICHARD LESTER WILCOX.